(12) United States Patent
Murphy

(10) Patent No.: US 7,487,952 B2
(45) Date of Patent: Feb. 10, 2009

(54) SPARE TIRE SECURITY DEVICE

(75) Inventor: Richard F. Murphy, Oak Lawn, IL (US)

(73) Assignee: Phy-Con, Inc., Oak Lawn, IL (US)

( * ) Notice: Subject to any disclaimer, the term of this patent is extended or adjusted under 35 U.S.C. 154(b) by 0 days.

(21) Appl. No.: 11/728,662

(22) Filed: Mar. 26, 2007

(65) Prior Publication Data
US 2008/0001131 A1 Jan. 3, 2008

(51) Int. Cl.
B66D 1/00 (2006.01)
(52) U.S. Cl. .................... 254/323; 414/463; 224/42.21; 224/42.25
(58) Field of Classification Search ................. 254/323; 414/463, 466, 462; 224/42.21, 42.25
See application file for complete search history.

(56) References Cited

U.S. PATENT DOCUMENTS

| 4,222,546 | A | * | 9/1980 | Walker, Jr. | 248/676 |
| 4,498,614 | A | * | 2/1985 | Guarr | 224/42.13 |
| 4,993,609 | A | * | 2/1991 | Flint | 224/42.2 |
| 5,118,017 | A | * | 6/1992 | Buck | 224/42.13 |
| 5,487,288 | A | * | 1/1996 | Frantz | 70/259 |
| 5,494,336 | A | * | 2/1996 | Russell | 301/37.372 |
| 5,823,413 | A | * | 10/1998 | Seltz | 224/402 |
| 6,003,922 | A | * | 12/1999 | Giesey et al. | 296/37.3 |
| D427,886 | S | * | 7/2000 | Markegard et al. | D8/341 |
| 6,427,885 | B1 | * | 8/2002 | Dexel | 224/42.24 |
| 6,648,577 | B2 | * | 11/2003 | Obriot | 414/463 |
| 6,749,094 | B1 | * | 6/2004 | Dexel | 224/42.24 |
| 2006/0104768 | A1 | * | 5/2006 | Park et al. | 414/463 |

* cited by examiner

Primary Examiner—Emmanuel M Marcelo
(74) Attorney, Agent, or Firm—McDermott Will & Emery LLP

(57) ABSTRACT

The present invention provides a security device for securing a spare tire and rim, retained by a winch mechanism, to the underside of an automobile. More specifically, the device includes a securing element that engages the rim and encloses a yoke of the winch mechanism to prevent a thief from severing the yoke and gaining access to the spare tire and rim. In a use position, the yoke extends through the primary opening in the rim and a fastener extends through a hole in the securing element and a secondary opening in the rim to connect the securing element to the rim, whereby the yoke is enclosed between the rim and the securing element.

20 Claims, 6 Drawing Sheets

US 7,487,952 B2

SPARE TIRE SECURITY DEVICE

CROSS-REFERENCE TO RELATED APPLICATIONS

Pursuant to 35 U.S.C. § 119 and or § 120, this application claims priority to pending U.S. patent application Ser. No. 11/143,263, filed on Jun. 3, 2005.

FEDERALLY SPONSORED RESEARCH OR DEVELOPMENT

Not Applicable.

TECHNICAL FIELD

The present invention provides a security device for securing a spare tire and rim, retained by a winch mechanism, to the underside of an automobile. More specifically, the device includes a securing element that engages the rim and encloses a yoke of the winch mechanism to prevent a thief from severing the yoke and gaining access to the spare tire and rim.

BACKGROUND OF THE INVENTION

In most sport utility vehicles (SUVs), the spare tire is located on the rear underside of the vehicle. A winch type mechanism includes a cable and yoke to couple the spare tire to the underside of the vehicle and permit ready access to the tire and rim when needed, such as a flat tire situation. However, a thief can easily cut the steel cable attached to the yoke and remove the spare tire and rim. Thus, the owner of the SUV will face the costly expense of replacing the entire winch mechanism, as well as the spare tire and the rim. Compounding this unfortunate situation is the fact that the SUV owner will not learn of the rim and tire theft until he or she attempts to access such in a time of need.

Accordingly, there is a need for a security device that provides a visual deterrent and an obstacle for a thief to access and severe the winch mechanism and thereby steal the spare tire and rim. Furthermore, there is a need for a security device that reasonably precludes access to the winch mechanism in order to secure a spare tire and rim to the underside of the vehicle. A full discussion of the features and advantages of the present invention is deferred to the following detailed description, which precedes with reference to the accompanying drawings.

SUMMARY OF THE INVENTION

The present invention provides a security device that secures a spare tire and rim to the underside of a vehicle, the rim having an outer circumference that corresponds to an inner circumference of the spare tire. The security device comprises a securing plate having an outer periphery and a plurality of centralized plate holes that are alignable with openings in the rim. When connected to the rim, the plate extends to the outer circumference of the rim to enclose a rim cavity defined inward of the outer circumference of the rim. To resist catastrophic failure, the securing plate is fabricated from glass-filled polypropylene According to another aspect of the invention, the security device also includes a plurality of elongated fasteners, each fastener extending through a plate hole and a rim opening to secure the plate to the rim. A nut is connected to a fastener to further secure the plate to the rim, wherein the nut resides between an inner surface of the rim and the underside of the vehicle.

According to another aspect of the invention, the security device further includes a winch mechanism that allows for detachable coupling of the tire and rim to the underside of the vehicle. The winch mechanism includes a cable and a yoke, the yoke residing within the central cavity. The securing element that encloses the rim cavity to prevent access to the yoke.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4 is a perspective view of the first alternate security device of FIG. 3, showing the securing element and a plurality of projections extending there from;

FIG. 6 is a perspective view of the second alternate security device of FIG. 5, showing the securing element and an annular projections extending there from;

DETAILED DESCRIPTION

The present invention is not intended to be limited to the above-mentioned embodiment. It is easily understood for those ordinary skilled in the art that there are also various modifications or alternatives without departing the conception and principle of the present invention. The scope of the present invention is defined by the appended claims.

Figure 1:
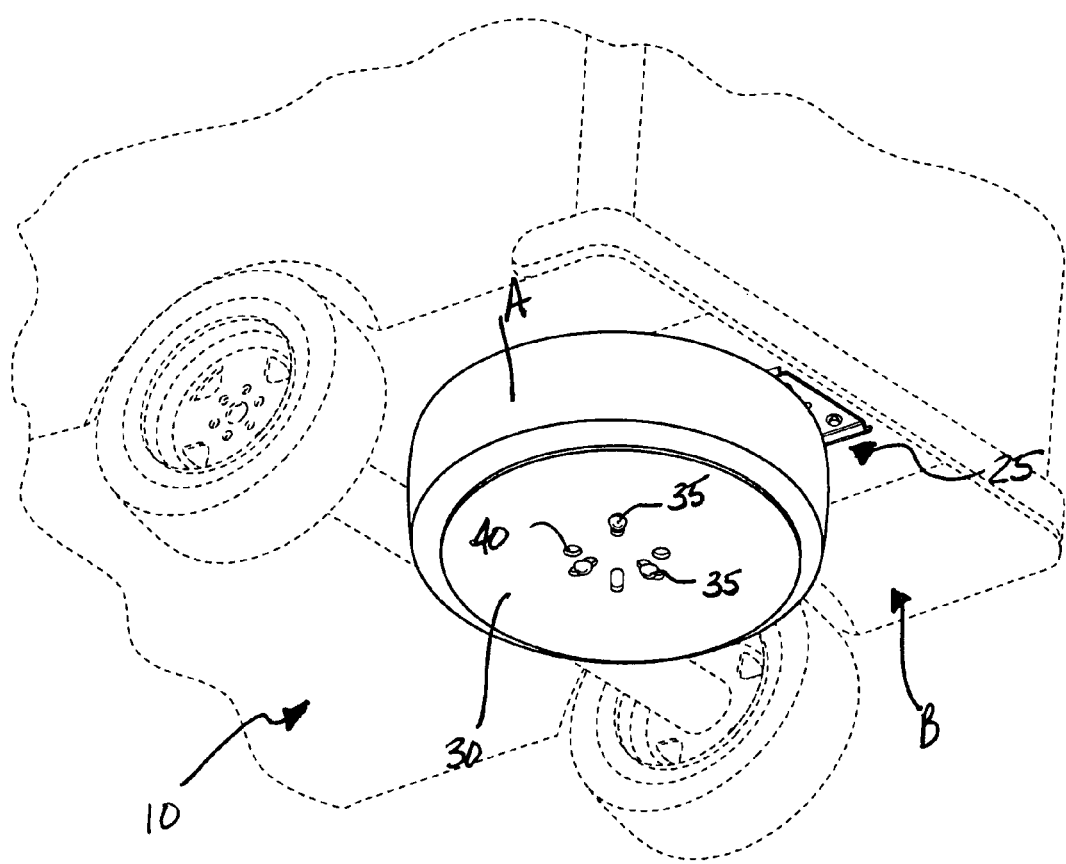
FIG. 1 is a perspective view of a security device used to secure a spare tire to the underside of a vehicle, showing the security device in an installed position wherein a securing element engages a spare tire and a rim.
Figure 2:
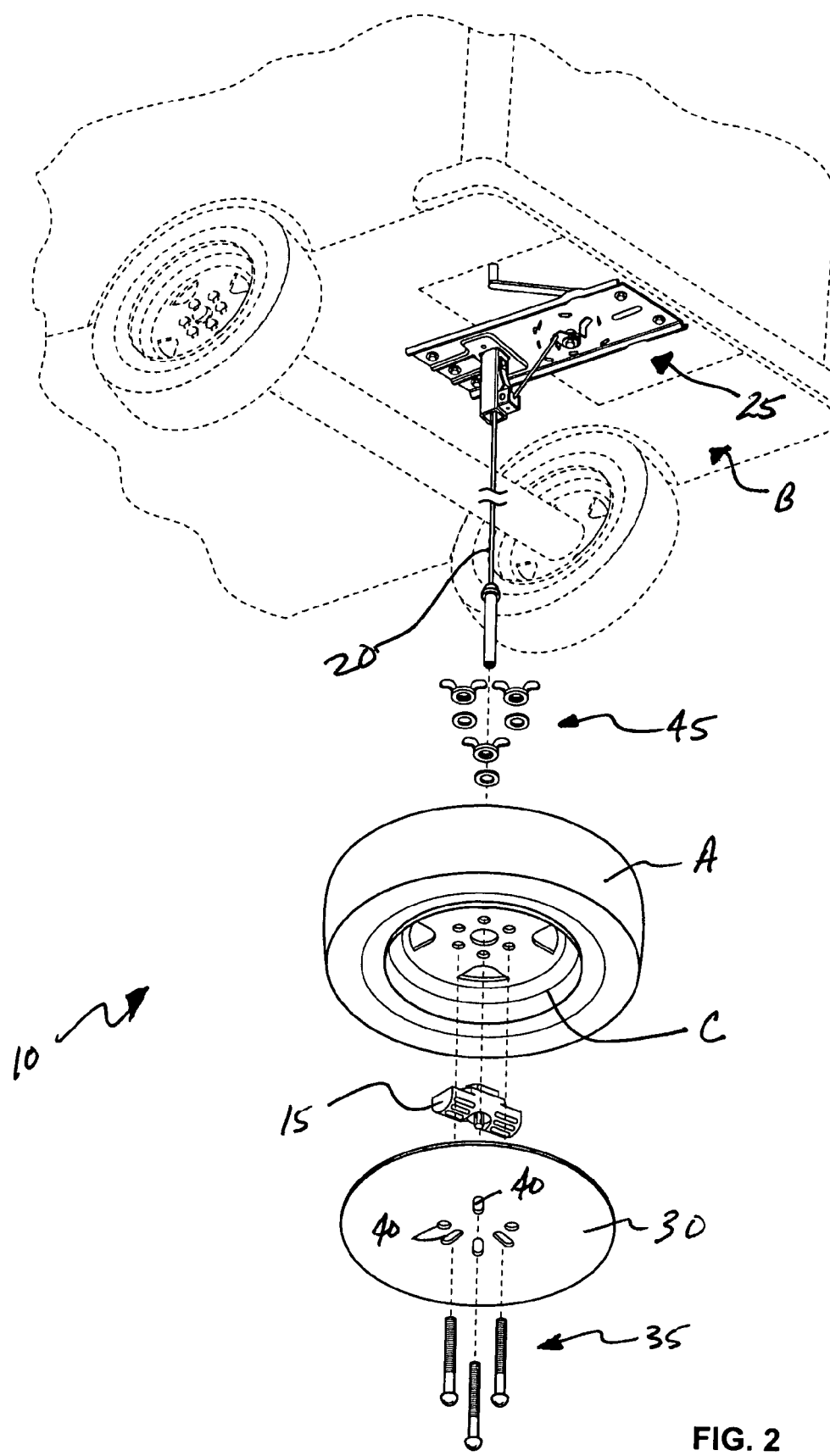
FIG. 2 is an exploded view of the security device of FIG. 1, showing the security element and the combined spare tire and rim separated from a winch mechanism and the vehicle.

Referring to FIGS. 1 and 2, the present invention provides a spare tire security device 10 that comprises a yoke 15 and cable 20 which couples the spare tire A to the underside of the vehicle B by means of a winch type mechanism 25. The security device 10 further comprises a securing element 30 with a plurality of elongated fasteners or bolts 35 extending through plate holes 40. In a preferred embodiment, the securing element 30 has a circular periphery, wherein the element 30 may be a circular plate. The securing element 30 is attached to an outer surface of the spare tire A and covers the rim C. The element 30 is secured in place by use of the fasteners 35 and nuts 45, such as wing nuts (as shown). Hence the security device 10 prevents unauthorized access to the yoke 15 and cable 20, thereby minimizing the possibility of theft.

Figure 3:
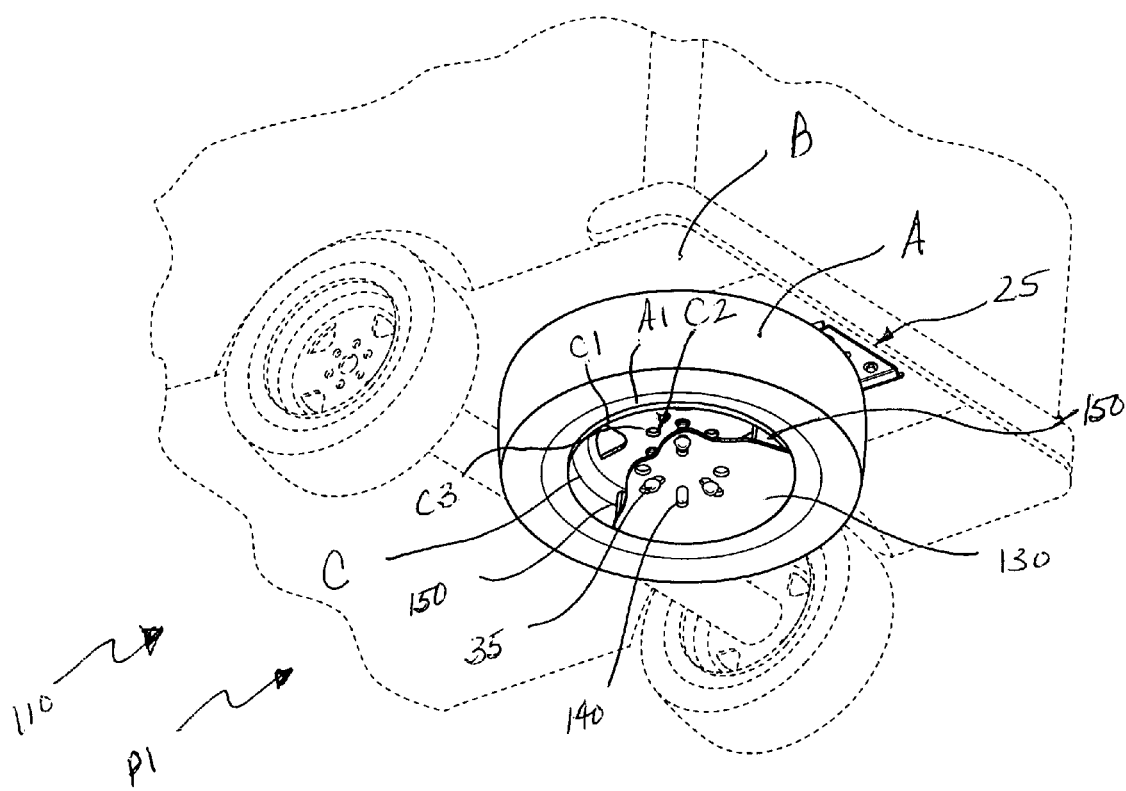
FIG. 3 is a perspective view of a first alternate security device of the invention, showing the security device in an installed position wherein a securing element engages the rim.
Figure 4:
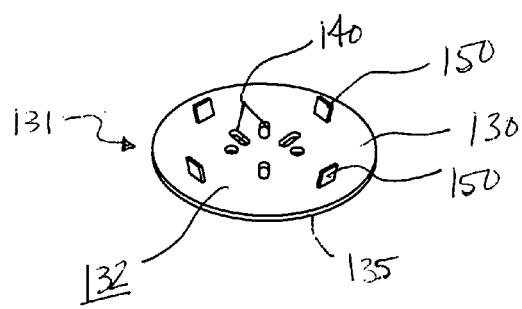

FIGS. 3 and 4 depict a second embodiment of the security device 110 in an installed position P1. In addition to the winch mechanism 25 mounted on the vehicle underside B and the spare tire A mounted on the rim C, the security device 110 comprises a securing element 130 having a plurality of centralized holes 140, which may be slots or round apertures. The security element 130, configured as a plate 131, includes at least one projection 150 that extends upward from an inner surface 132 of the element 130. In the embodiment of FIGS. 3 and 4, the element 130 has a plurality of projections 150 that are spaced a distance apart within the circular periphery 135 of the element 130.

In the use position P1 of FIG. 3, the spare tire A is mounted on the rim C, and both are detachably coupled to the vehicle underside B by the winch mechanism 25. The rim C has an outer circumference or periphery C1 that corresponds to an inner circumference A1 of the spare tire A at the interface region there between. When connected in the use position P1, the plate 130 extends to the outer circumference C1 of the rim C to enclose a rim cavity C2 defined inward of the outer rim circumference C1 of the rim. In contrast, the securing element 30 of FIGS. 1 and 2 extends beyond the rim circumference C1 and overlaps a sidewall region of the tire A. Most conventional rims C have a recessed central portion that is the cavity C2 and that is radially inward of the rim periphery C1. Also, the rim C has a primary, central opening and a plurality of secondary openings C3 arrayed about the central opening. In the use position P1, the element holes 140 are aligned with the secondary rim openings C3 and an elongated fastener 35, such as a bolt, extends through a hole 140 and a secondary opening C3 to connect the securing element 130 to the rim C and enclose the cavity C2. A nut 45 may be utilized to secure the fastener 35, wherein the nut 45 resides between the rim C and the vehicle underside B. Also in the use position P1, the cable 20 extends through the primary opening in the rim C and the yoke 15 is secured to the cable 20, wherein both the yoke 15 and a terminal end of the cable 20 reside within the cavity C2. Thus, the securing element 130 enclose the yoke 15 and the cable end 20 within the cavity C2 and prevents access thereto by a thief or vandal. To further stabilize the element 130 in the use position P1, the projections 150 extend towards and engage the inner surface of the rim C proximate an inner wall adjacent the rim periphery C1. Accordingly, in the use position P1, the securing element 130 protects the rim C from road-related damage, such as salt and rocks, and restricts access to the cable 20 and yoke 15 to reduce the likelihood of either being severed to enable a thief to steal the tire A and rim C and damage the winch mechanism 25. The securing element 130 is preferably fabricated from a polymer, preferably polypropylene and most preferably glass-filled polypropylene. When a thief or vandal attempts to pry an element 130 formed from glass-filled polypropylene, the element 130 will resist catastrophic fracture and instead will chip into numerous small pieces. As a result, a thief will be forced to spend a considerable amount of time to destroy the element 130 and gain access to the rim C and the yoke 15 and cable 20.

Figure 5:
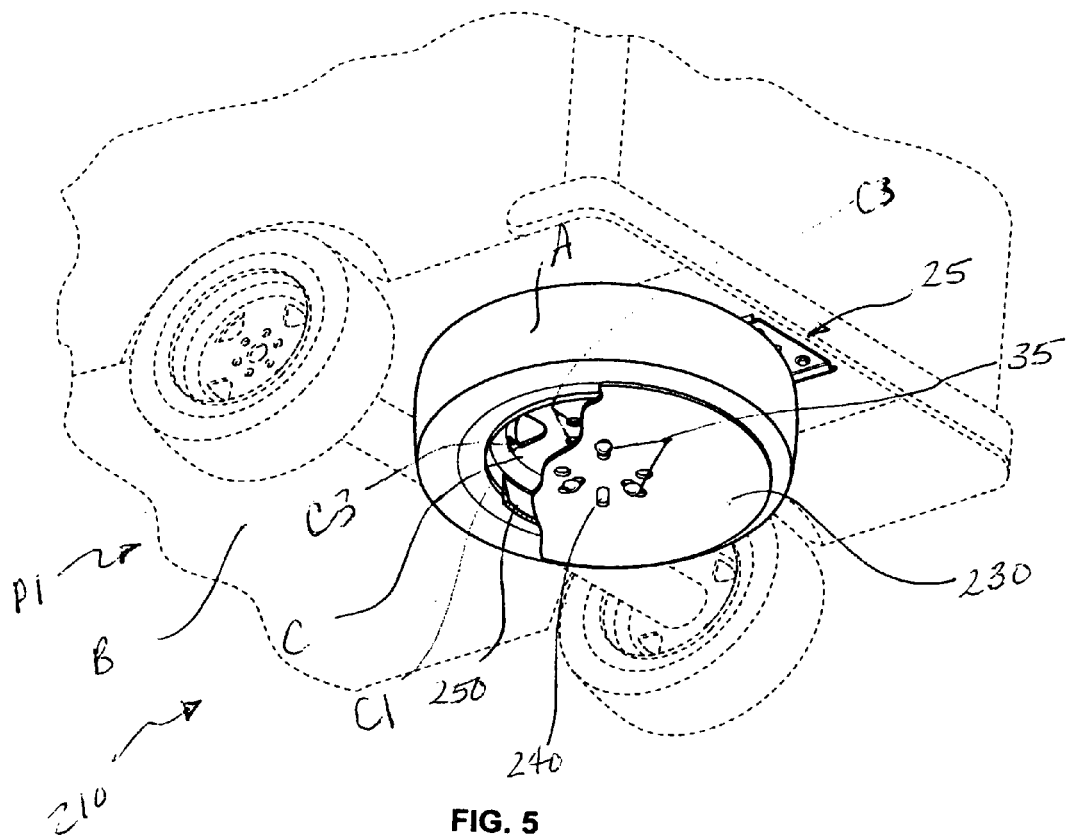
FIG. 5 is a perspective view of a second alternate security device of the invention, showing the security device in an installed position wherein a securing element engages the spare tire and the rim.
Figure 6:
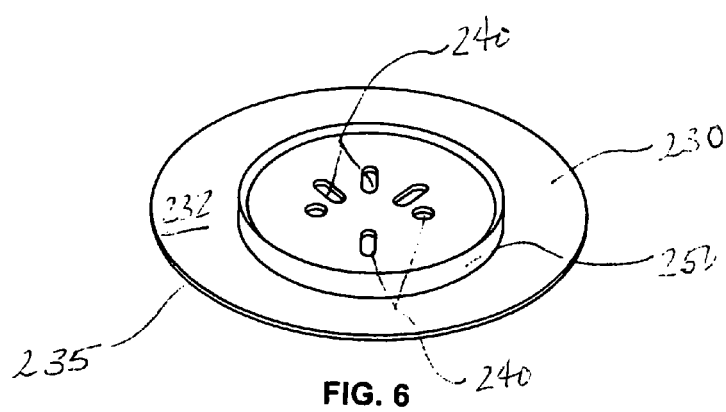

FIGS. 5 and 6 depict a third embodiment of the security device 210 in the installed position P1. The security device 210 comprises a securing element 230 that is similar in operation to that described in the foregoing paragraph, however, the element 230 includes an annular or ring-shaped projection 250 that extends upward from the inner plate surface 232. As shown in FIG. 6, the projection 250 resides radially outward of the element holes 240 but inward of the element periphery 235. In the use position P1 of FIG. 5, the annular projection 250 resides within the outer rim circumference C1 to enclose the rim cavity C2. The outer rim circumference C1 is also considered the lip of the rim C, wherein a continuous sidewall extends inward from the rim lip/circumference C1. In the use position P1, the element holes 240 are aligned with the secondary rim openings C3 and an elongated fastener 35, such as a bolt, extends through a hole 240 and a secondary opening C3 to connect the securing element 230 to the rim C and enclose the cavity C2. A nut 45 may be utilized to secure the fastener 35, wherein the nut 45 resides between the rim C and the vehicle underside B. Also in the use position P1, the cable 20 extends through the primary opening in the rim C and the yoke 15 is secured to the cable 20, wherein both the yoke 15 and a terminal end of the cable 20 reside within the cavity C2. Thus, the securing element 230 encloses the yoke 15 and the cable end 20 within the cavity C2 and prevents access thereto by a thief or vandal.

To further stabilize the securing element 230 in the use position P1, the projection 250 engages the inner surface of the rim C proximate an inner wall adjacent the rim periphery C1. If a thief inserts an elongated object, such as a crowbar, between the element 230 and the tire A to pry the two components apart, the projection 250 may slide along the rim lip C1 and away from the inner surface of the rim C. However, to deter this prying and delay separation of the element 230 from the rim C, the projection 250 is configured with a sufficient depth to maintain contact with the rim periphery C1 and prevent access to the cavity C2. Accordingly, in the use position P1, the securing element 130 protects the rim C from road-related damage, such as salt and rocks, and restricts access to the cable 20 and yoke 15 to reduce the likelihood of either being severed to enable a thief to steal the tire A and rim C and damage the winch mechanism 25.

Figure 7:
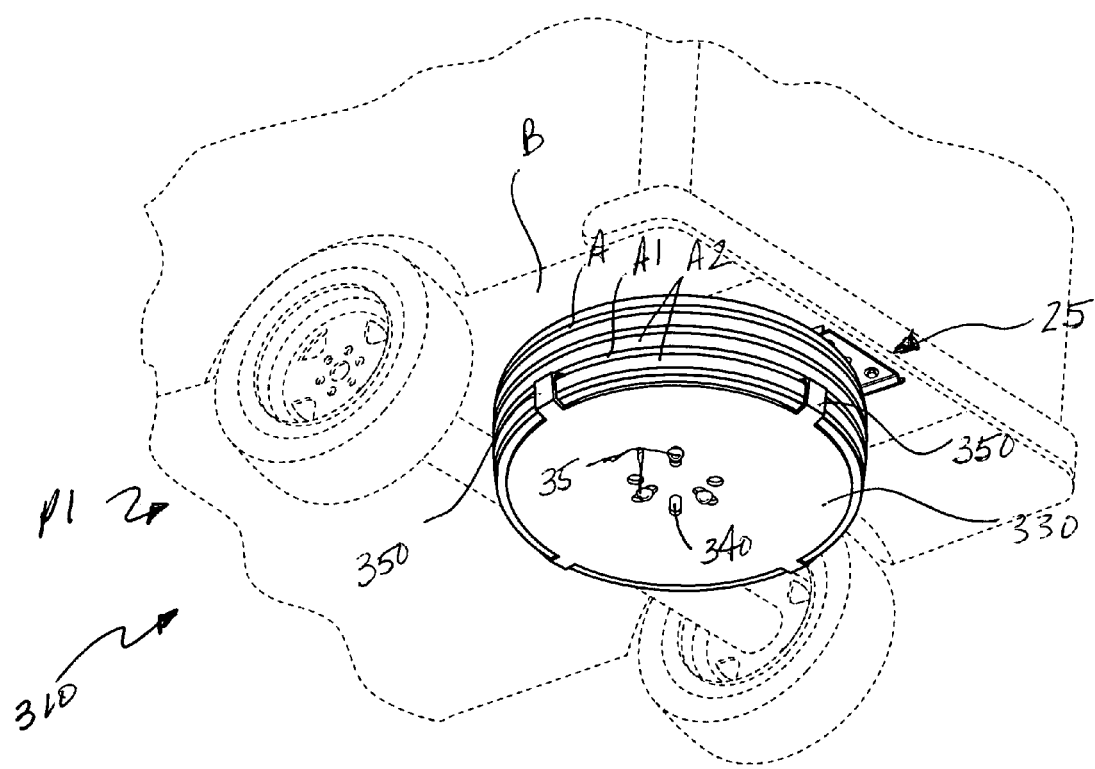
FIG. 7 is a perspective view of a third alternate security device of the invention, showing the security device in an installed position wherein a securing element engages the spare tire and the rim and a plurality of fingers extend between a pair of tire tread blocks.
Figure 8:
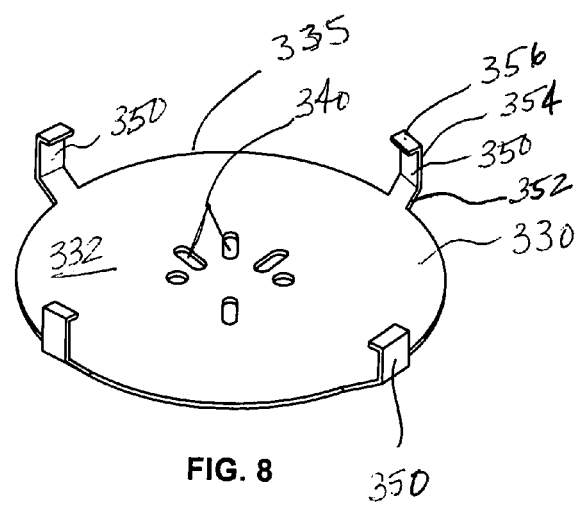
FIG. 8 is a perspective view of the third alternate security device of FIG. 7, showing the securing element and a plurality of upwardly extending fingers.

FIGS. 7 and 8 depict a fourth embodiment of the security device 310 in the installed position P1. The security device 310 comprises a securing element 330 that is similar in operation to that described in the foregoing paragraph, however, the element 330 includes at least one projection finger 350, that is preferably flexible, that extends upward from the plate periphery 335. In a preferred embodiment, the element 330 has four circumferentially spaced fingers 350. In the use position P1 of FIG. 7, the projection 350 resides within the tire groove A1 between two adjoining tire tread blocks A1 to enclose the rim cavity C2. The finger includes an angled base portion 352, a substantially linear intermediate portion 354 and an inwardly directed terminal portion 356 that is received within the tire groove A1. Also in the use position P1, the element 330 overlaps the rim C and the element holes 240 are aligned with the secondary rim openings C3. An elongated fastener 35, such as a bolt, extends through a hole 340 and a secondary opening C3 to connect the securing element 330 to the rim C and enclose the cavity C2. A nut 45 may be utilized to secure the fastener 35, wherein the nut 45 resides between the rim C and the vehicle underside B. Also in the use position P1, the cable 20 extends through the primary opening in the rim C and the yoke 15 is secured to the cable 20, wherein both the yoke 15 and a terminal end of the cable 20 reside within the cavity C2. Thus, the securing element 330 encloses the yoke 15 and the cable end 20 within the cavity C2 and prevents access thereto by a thief or vandal.

Figure 9:
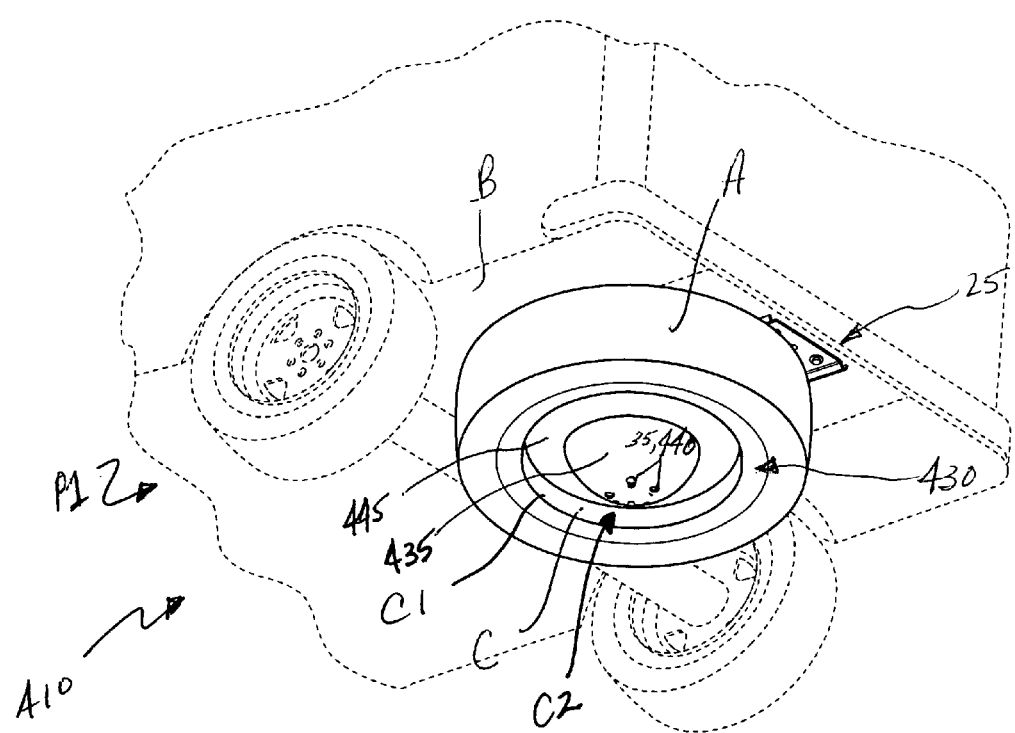
FIG. 9 is a perspective view of a fourth alternate security device of the invention, showing the security device in an installed position wherein a securing element resides within a recessed cavity of the wheel; and, FIG. 10 is a perspective view of the fourth alternate security device of FIG. 9, showing the securing element having a flange and a bulbous central portion.
Figure 10:
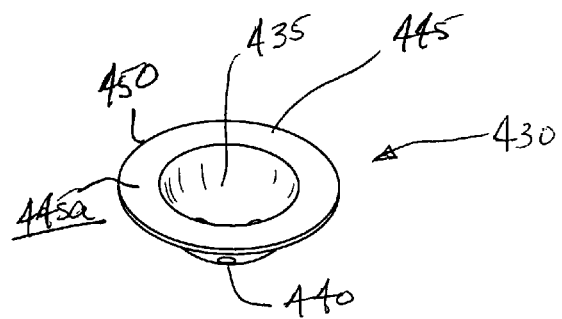

FIGS. 9 and 10 depict a fifth embodiment of the security device 410 in the installed position P1. In addition to the winch mechanism 25 mounted on the vehicle underside B and the spare tire A mounted on the rim C, the security device 410 comprises a curvilinear securing element 430. The securing element 430 includes a bulbous central portion 435 and a plurality of element holes 440. A planar flange 445 extends radially outward from the central portion 435 and defines an outermost periphery 450 of the element 430. In another embodiment, the flange 445 is omitted and the bulbous central portion 435 is the dominant structure of the element 430.

In the use position P1 of FIG. 9, the securing element 430 resides within the rim periphery C1 and encloses the rim cavity C2. As such, the inner surface 445a of the flange 445 engages the inner surface of the rim C. Preferably, the securing element 430 is sized such that the element periphery 450 is less than the rim periphery C1 such that the element 430 fits within the rim periphery C1. Alternatively, the element periphery 450 is increased whereby the flange 445 overlaps the rim periphery C1. Also in the use position P1, the element holes 440 are aligned with the secondary rim openings C3. An elongated fastener 35, such as a bolt, extends through a hole 440 and a secondary opening C3 to connect the securing element 330 to the rim C and enclose the cavity C2. A nut 45 may be utilized to secure the fastener 35, wherein the nut 45 resides between the rim C and the vehicle underside B. Also in the use position P1, the cable 20 extends through the primary opening in the rim C and the yoke 15 is secured to the cable 20, wherein both the yoke 15 and a terminal end of the cable 20 reside within the cavity C2. Thus, the securing element 430 encloses the yoke 15 and the cable end 20 within the cavity C2 and prevents access thereto by a thief or vandal. Due to its bulbous shape, the central portion 435 extends beyond the sidewall of the tire A and is visible to provide a visual deterrent to a potential thief or vandal. However, the central portion 435 should not extend so far beyond the tire A that it makes contact with the ground when the vehicle is driven. Alternatively, the overall height of the central portion 435 is reduced such that it remains within the cavity C2 and does not extend below the sidewall of the tire A.

Numerous modifications may be made to the foregoing invention without departing from the basic teachings thereof. Although the present invention has been described in substantial detail with reference to one or more specific embodiments, those of skill in the art will recognize that changes may be made thereto without departing from the scope and spirit of the invention.

What is claimed is:

1. A security device that secures a spare tire and rim to the underside of a vehicle, the rim having an outer circumference that corresponds to an inner circumference of the spare tire, the security device comprising:
   a securing plate having an outer periphery and a plurality of centralized plate holes that are alignable with openings in the rim;
   wherein when connected to the rim, the plate extends to the outer circumference of the rim to enclose a rim cavity defined inward of the outer circumference of the rim.

2. The security device of claim 1, further comprising a plurality of elongated fasteners, each fastener extending through a plate hole and a rim opening to secure the plate to the rim.

3. The security device of claim 2, further comprising a nut that is connected to a fastener to further secure the plate to the rim, wherein the nut resides between the rim and the underside of the vehicle.

4. The security device of claim 1, wherein the securing plate has a circular periphery and a diameter that corresponds to a diameter of the rim.

5. The security device of claim 1, wherein the securing plate extends beyond the rim circumference and overlaps an inner periphery of the spare tire.

6. The security device of claim 1, wherein an inner surface of the securing plate includes at least one projection that engages an outer surface of the rim when the plate is connected to the rim.

7. The security device of claim 1, wherein an inner surface of the securing plate includes an annular projection that engages an outer surface of the rim when the plate is connected to the rim.

8. The security device of claim 1, wherein the securing plate is fabricated from glass-filled polypropylene.

9. A security device for securing a spare tire to the underside of a vehicle, the security device comprising:
   a spare tire assembly including a tire mounted on a rim, the rim having a recessed central cavity residing inward of a rim periphery;
   a winch mechanism that allows for detachable coupling of the tire and rim to the underside of the vehicle, the winch mechanism including a cable and a yoke, the yoke residing within the central cavity; and,
   a securing element that encloses the rim cavity to prevent access to the yoke.

10. The security device of claim 9, wherein the securing element has a periphery that resides between the rim periphery and an outer tire periphery.

11. The security device of claim 9, wherein the securing element has a circular outer periphery that overlaps the rim periphery.

12. The security device of claim 9, wherein an inner surface of the securing element includes at least one projection that extends into the rim cavity to engage an outer surface of the rim.

13. The security device of claim 9, wherein an inner surface of the securing plate includes an annular projection that extends into the rim cavity to engage an outer surface of the rim.

14. The security device of claim 9, wherein the outer periphery of the securing element includes at least one upwardly extending finger that is received between a pair of tire tread blocks.

15. The security device of claim 9, wherein the securing element includes an annular flange and a bulbous central portion, wherein the central portion is positioned over the openings in the rim.

16. The security device of claim 15, wherein the annular flange resides within the rim periphery and the central portion does not extend below the tire when the securing element is connected to the rim.

17. A security device for securing a spare tire and a rim to the underside of a vehicle, the apparatus comprising:
   a spare tire assembly including a tire mounted on a rim, the rim having a primary opening and a plurality of secondary openings arrayed about the central opening;
   a winch mechanism that allows for detachable coupling of the tire and rim to the underside of the vehicle, the winch mechanism including a cable and a yoke;
   a securing element having a plurality of holes;
   a plurality of elongated fasteners; and,
   wherein in a use position, the yoke extends through the primary opening in the rim, and a fastener extends through a hole in the securing element and a secondary opening in the rim to connect the securing element to the rim, whereby the yoke is enclosed between the rim and the securing element.

18. The security device of claim 17, wherein the rim has as recessed central cavity, and wherein in the use position, the securing element resides within the central cavity to enclose the yoke therein.

19. The security device of claim 17, wherein the securing element has a bulbous central portion.

20. The security device of claim 19, wherein the securing element further includes a planar flange extending radially outward from the central portion.

* * * * *